United States Patent
Qaddoura

(12) 
(10) Patent No.: US 6,646,987 B1
(45) Date of Patent: Nov. 11, 2003

(54) METHOD AND SYSTEM FOR TRANSMISSION CONTROL PROTOCOL (TCP) PACKET LOSS RECOVERY OVER A WIRELESS LINK

(75) Inventor: Emad Qaddoura, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/327,610

(22) Filed: Jun. 8, 1999

Related U.S. Application Data

(60) Provisional application No. 60/103,023, filed on Oct. 5, 1998.

(51) Int. Cl.$^7$ .............................................. H04L 12/24
(52) U.S. Cl. ...................................... 370/231; 370/252
(58) Field of Search .................................. 370/230, 231, 370/232, 233, 234, 235, 252, 254; 714/774, 776, 779

(56) References Cited

U.S. PATENT DOCUMENTS

| | | | |
|---|---|---|---|
| 5,974,028 A | * 10/1999 | Ramakrishnan | 370/229 |
| 6,038,216 A | * 3/2000 | Packer | 370/231 |
| 6,178,450 B1 | * 1/2001 | Ogishi et al. | 709/224 |
| 6,201,791 B1 | * 3/2001 | Bournas | |

OTHER PUBLICATIONS

Caceres, Ramon; Danzig, Peter B; Jamin, Sugih; Mitzel, Danny J.; *Characteristics of Wide–Area TCP/IP Conversations* (Aug. 1991).
Paxson, Vern; *Empirically Derived Analytic Models of Wide–Area TCP Connections* (Aug. 1994).
Amir, Elan; Balakrishnan, Hari; Seshan, Srinivasan; Katz, Randy H.; *Efficient TCP Over Networks with Wireless Links* (1995).
Bakre, Ajay; Badrinath, B.R.; *I–TCP: Indirect TCP for Mobile Hosts* (1995).
Chaskar, H.; Lakshman, T.V.; Madhow, U.; *On The Design of Interfaces for TCP/IP Over Wireless* (1996).
Hoe, Janey C.; *Improving the Start–Up Behavior of a Congestion Control Scheme for TCP* (1996).
Crow, Brian P.; Widjaja, Indra; Kim, Jeong Geun; Sakai, Prescott; *IEEE 802.11 Wireless Local Area Networks* (Sep. 1997).
Lakshman, T.V.; Madhow, Upamanyu; *The Performance of TCP/IP for Networks with High Bandwidth–Delay Products and Random Loss* (1997).
Balakrishnan, Hari; Padmanabhan, Venkata N.; Seshan, Srinivasan; Katz, Randy H.; *A Comparison of Mechanisms for Improving TCP Performance Over Wireless Links* (Dec. 1997)—2 versions.
Chandran, Kartik; Raghunathan, Sudarshan; Venkatesan, S.; Prakash, Ravi; *A Feedback Based Scheme For Improving TCP Performance In Ad–Hoc Wireless Networks* (1998).
Allman, M.; Floyd, W.; Partridge C.; *Increasing TCP's Initial Window* (*Internet—Draft*), (May 1998).
Poduri, K; Nichols, K.; *Simulation Studies of Increased Initial TCP Window Size* (*Internet—Draft*), (Feb. 1998).

* cited by examiner

*Primary Examiner*—Steven Nguyen
*Assistant Examiner*—Duc Duong
(74) *Attorney, Agent, or Firm*—Haynes and Boone, LLP

(57) ABSTRACT

A method and system for Transmission Control Protocol (TCP) packet loss recovery over a wireless link where the packet loss is due to a high Bit Error Rate (BER). Such a method and system allows the exponential growth of a TCP congestion window for every acknowledgement packet that is received after a retransmission timers expires and/or three duplicate acknowledgement packets are received. In such a scenario, a maximum amount of data is transmitted via the exponentially growing TCP congestion window thereby optimizing and increasing packet throughput. A method and system for setting the congestion window to a greater amount than originally set of the maximum allowed window size is also presented. Further, a method and system for, as the BER changes between low and high, automatically adjusting the congestion window size to be a variable of the maximum allowed window size and dynamically adjusting the packet size is presented.

12 Claims, 2 Drawing Sheets

METHOD AND SYSTEM FOR TRANSMISSION CONTROL PROTOCOL (TCP) PACKET LOSS RECOVERY OVER A WIRELESS LINK

This application claims the benefit of U.S. provisional application No. 60/103,023, filed Oct. 5, 1998.

BACKGROUND

This disclosure relates generally to packet loss recovery and, more particularly, to a method and system for Transmission Control Protocol (TCP) packet loss recovery over wireless links.

TCP/IP (Transmission Control Protocol/Internet Protocol) is a communications language or protocol that is used to allow the transfer of information in various networks. Such networks include the Internet, intranets and extranets, and wireless networks.

TCP/IP is a two-layered program. The higher layer, Transmission Control Protocol, manages the assembling of a message or file into smaller packets that are transmitted over a particular network and received by a TCP layer that reassembles the packets into the original message. The lower layer, Internet Protocol, handles the address part of each packet so that it gets to the right destination. Each source on the network checks this address to see where to forward the message. Even though some packets from the same message are routed differently than others, they are reassembled at the destination.

TCP/IP uses the client/server model of communication in which, for example, a computer user (a client) requests and is provided a service (such as sending a Web page) by another computer (a server) in the network. TCP/IP communication is primarily point-to-point, meaning each communication is from one point (or host computer) in the network to another point or host computer. TCP/IP and the higher-level applications that use it are collectively said to be "connectionless" because each client request is considered a new request unrelated to any previous one (unlike ordinary phone conversations that require a dedicated connection for the call duration). Being connectionless, network paths are free and can thus be used continuously (the TCP layer itself is not connectionless as far as any one message is concerned. Its connection remains in place until all packets in a message have been received).

The general characteristics of TCP/IP are well known to those of average skill in the art and thus will not be described further herein.

As wireless multi-media technology evolves, the need is arising to improve TCP's performance over wireless lossy links. The wireless links are said to be lossy because, unlike wireline links, the potential for signal fading and propagation is increased. For example, TCP's congestion control is built to handle packet loss due to congestion in the network. This congestion control works well in a wireline network but, over wireless links, there is great traffic throughput degradation because of TCP's mechanism of handling congestion. The use of this mechanism, which is formally called slow start, congestion avoidance, and retransmission timer backoff, results in decreased throughput.

In standard TCP, congestion is indicated on timeout or on reception of duplicate acknowledgments and forces a congestion window (which contains a number of packets or segments) to have the same value for all users regardless of the optimal maximum window size. Additionally, a slow start threshold is used to increase the packet size to a particular threshold (e.g. 64 bytes). The congestion window (cwnd) and the slow start threshold (ssthresh) are two of the main variables that are used to manage the behavior of the growth for the transmission window in TCP. Initially, TCP's congestion avoidance starts with an exponential growth for the transmission window. This is accomplished by having the cwnd initialized to a value that is less than the ssthresh. As the window grows, the cwnd is incremented exponentially until its value becomes greater than the value of the ssthresh. Once the value of the cwnd is greater than the ssthresh, the transmission window grows linearly.

Slow start is entered in the beginning of a TCP session and also as a result of congestion. A timeout causes the cwnd to be set to one. In addition, slow start initially sets the ssthresh to one half of the minimum of the current window and the receiver's advertised window, but not less than two. The congestion window grows exponentially with the arrival of acknowledgments, until the ssthresh becomes less than the cwnd. At this stage, the congestion avoidance phase is entered.

Congestion avoidance indicates a linear growth in the congestion window. The linear growth in the cwnd is accomplished by incrementing the cwnd by one segment for every full window's worth of acknowledged segments.

The retransmission timer follows an exponential backoff mechanism. Once the retransmission timer expires, it is restarted with a value that is twice its current timer value. A timeout occurs when the retransmission timer counts down to zero.

Another current TCP congestion mechanism is called TCP Reno which provides a fast retransmit and a fast recovery. Fast retransmit allows TCP to retransmit lost packets on receiving three duplicate acknowledgments without having to wait for the retransmission timer to expire. Three duplicate acknowledgments are interpreted to indicate a loss of the segment. In this case, the ssthresh is set to half of the minimum of the cwnd and the receiver's advertised window. The cwnd is set to the ssthresh plus 3 times the segment size. Each time a duplicate acknowledgment is received, the cwnd is incremented by the size of one segment. Fast Recovery allows TCP to start congestion avoidance, instead of slow start, after fast retransmission allows the cwnd to be larger that ssthresh. When the first received acknowledgment for a new data segment is received, cwnd is set to the value of ssthresh. This results in the activation of the congestion avoidance algorithm.

While the theory of slow start and congestion avoidance are very effective in wireline networks, they are not effective in a wireless environment (for example, a Local Area Network (LAN)) under high Bit Error Rate (BER). Further, they do not allow TCP to send as much data as possible within a threshold that optimizes throughput while recovering from a high bit error rate on a wireless LAN link.

Typical TCP forces the congestion window to have the same value for all users regardless of the optimal maximum window size. Furthermore, this causes users with higher bandwidth demand to obtain similar throughput while recovering from a loss.

A number of prior art methods and systems for minimizing the impact of wireless losses on TCP connections will be described below. In a paper titled, "I-TCP: Indirect TCP for Mobile Hosts" by Bakre et al., a recommendation is made to use two TCP connections for a mobile host to obtain service with a host on the fixed side of the network. One connection is between the mobile host and the base station. The other one is between the base station and the fixed end host. The intention of I-TCP is to hide handoffs from the fixed host and transfer the connection state from the base station which is currently servicing the mobile host to the new base station which is receiving it. Another intention of I-TCP is to shield the wireline part of the network from the lossy nature of the wireless part of the network. The simulation results in I-TCP provide in some cases about twice the performance of regular TCP.

In a paper titled, "A Comparison of Mechanisms for Improving TCP Performance Over Wireless Links" by Balakrishnan et al., a comparative analysis was done between several TCP proposals and the "Snoop" protocol, a TCP aware link layer solution. The authors recommend utilizing a link layer which leverages on TCP acknowledgments instead of generating its own. In addition, the link layer protocol could be preserved by maintaining its ability to retransmit packets locally and on a much faster time scale than TCP. When packet loss is about 10% or greater, the TCP aware link layer can help retransmit the competing packets over the link and the transport layers. The simulation indicated a 10–30% throughput gain due to the use of a link layer that is TCP aware compared to other TCP versions which use a link layer operating independently of TCP. The authors recommended the use of TCP aware link layer with selective acknowledgments to gain an optimal throughput for TCP.

While both I-TCP and Snoop have certain advantages, they are designed with the intention of minimizing the impact of wireless losses on TCP connections that are primarily wireline (only one hop in the connection is wireless and the remaining are wireline). Therefore, these solutions may not be appropriate for a fully wireless network.

In a paper titled, "Improving the Start-up Behavior of a Congestion Control Scheme for TCP" Hoe discusses an approach to modify the setting of the ssthresh to a value that is based on the bandwidth-delay product for a wireline environment. Initially, ssthresh was set to 64. After connection establishment, the bandwidth is calculated by using the least-squares estimation on three closely spaced acknowledgments received at the sender and their respective time of receipt. In addition, changes were made to the fast retransmit algorithm by sending a new data segment after the second duplicate acknowledgment. While these modifications are intended to avoid the wait for unnecessary timeouts, a more aggressive approach in recovering from packet losses in a wireless environment is needed.

A few internet drafts have been submitted to the Internet Engineering Task Force (IETF) standards body describing the throughput benefit of changing the initial window size to a value that is higher than one. In a paper titled, "Simulation Studies of Increased Initial TCP Window Size" by Podri, et al. the initial window size is set to a value of one, three or four segments for a wireline simulation environment. The results in some cases show increased link utilization and reduced link delay with the simulation of FTP and HTTP sessions.

The Internet draft from Allman et al. titled, "Increasing TCP's Initial Window" recommends increasing the initial window from one segment to roughly 4K. Simulation results show improved throughput of up to 30% for satellite systems. For FTP connections, a reduction in transfer time in some cases was about 10% for a small file of 16 KB. A small increase in the drop rate was indicated but the finish time of a file transfer was still reduced. The draft recommends the use of the increased initial window in short lived TCP connections and connections over links with long RTT.

While these Internet drafts have some advantages, they do not discuss optimizing a maximum window size or implementing a rate of growth in the window in a form different from TCP Reno.

SUMMARY

Therefore, it is an object of the present invention to provide a method and system for TCP packet loss recovery over a wireless link where the packet loss is due to a high BER that overcomes the limitations described above. Such a method and system allows the exponential growth of a TCP congestion window for every acknowledgement packet that is received after a retransmission timers expires and/or three duplicate acknowledgement packets are received. A maximum amount of data is then transmitted via the exponentially growing TCP congestion window thereby optimizing and increasing packet throughput.

It is a further object of the present invention to provide a method and system for setting the congestion window to a greater amount than originally set of the maximum allowed window size.

It is a further object of the present invention to provide a method and system for, as the BER changes between low and high, automatically adjusting the congestion window size to be a variable of the maximum allowed window size and dynamically adjusting the packet size.

These objects, as well as others which will become apparent, are achieved in a system that includes mobile terminals (such as mobile phones, personal computers, laptops, etc.) wirelessly coupled to basestations in a wireless LAN network, wherein the maximum possible TCP window can be utilized to transfer data over wireless links when recovering from high BER. As such, the quality of the data and the efficiency of the network are improved.

DESCRIPTION OF A PREFERRED EMBODIMENT

Figure 1:
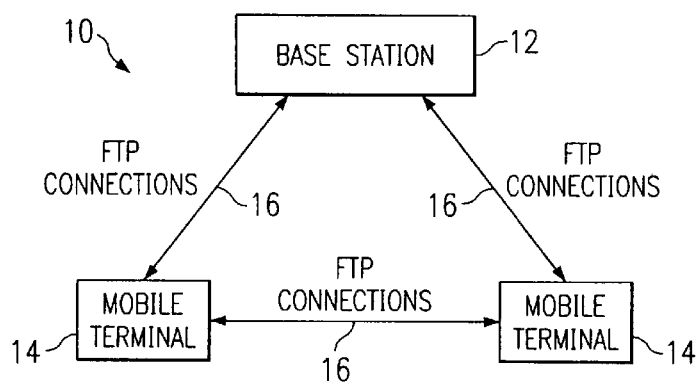
FIG. 1 is a diagrammatic view of a system of the present invention.

FIG. 1 depicts a system of the present invention shown in general by the reference numeral 10. The system 10 is a wireless LAN and includes a basestation 12 and a plurality of mobile terminals 14 wirelessly coupled to the basestation 12 and to one another. The basestation 12 may be connected to a larger network such as a Packet Data Network (PDN) (not shown) for sending and receiving information to and from the PDN users. In this scenario, the basestation 12 is used as a means for accessing the wireline network. Additionally, the information may be sent and received between the plurality of mobile terminals 14. Since this invention relates to TCP packet loss recovery over a wireless link, the wireline network will not be discussed. The basestation 12 and the mobile terminals 14 transmit and receive packets to and from one another respectively. As such, the basestation 12 and the mobile terminals 14 can each act as a source and a destination. The packets are being transmitted and received over a wireless TCP link and may contain voice, data, and/or graphical (e.g. multi-media) information. Since wireless links are lossy (as described above), the possibility exists, especially under high BER, that packets may be lost. In such a situation, the performance of a service between users and the quality of the network will decrease. Thus the need for an efficient and effective packet loss recovery solution (from, for example, signal fading) is needed where the maximum possible TCP window can be utilized to transfer data. This solution (of the present invention) will be called TCP Noor.

Traditional (i.e. wireline) slow start and congestion avoidance mechanisms perform well in TCP Reno (described above) under a low BER. However, as the BER increases, utilizing slow start and congestion avoidance mechanisms result in significant throughput penalties. TCP Noor, however, allows the recovery scheme from packet (or link) losses to utilize the available bandwidth in a more aggressive manner by providing and utilizing a larger congestion window. In addition, TCP Noor allows an exponential growth of the congestion window for every acknowledged packet. These modifications result in significant throughput improvements when the bit error rate is high ((such as $10^{**}-3$) i.e. ten to the minus three)).

Additionally, the traditional slow start and congestion avoidance mechanisms must be modified under such high bit error rates to be less conservative in the transmission of packets. Despite a potential higher data loss in TCP Noor due to the larger congestion window, TCP Noor had (via experiments run with non-bursty File Transfer Protocol (FTP) traffic 16) up to 35 times better throughput than TCP Reno. The higher data loss may occur because as the congestion window is growing with more packets being sent, some of the packets may get lost during signal fading, for example. The throughput, however, is increased because more packets are being sent. Additionally, the packets are continuously sent until the fading ends or the BER decreases which allows the window size to operate at an optimal level (even during the fading). With traditional TCP mechanisms, however, the congestion window must gradually be "built" back up to the level it was at before the signal fading or high BER occurred (and the congestion window must have the same value for all users regardless of the optimal maximum window size. As stated above, this causes users with higher bandwidth demand to obtain similar throughput while recovering from a loss. Additionally, there may be extended periods in which a user does not transmit any packets). Thus, TCP Noor considers the congestion window to be a variable of the maximum window for wireless LAN TCP users.

Congestion control in standard TCP limits bandwidth utilization in a wireless LAN due to the setting of the congestion window to one on a timeout. Under high BER, the resultant time period during which the congestion window remains one is prolonged due to the recurring timeouts and packet losses. As a result, the bandwidth utilization under a wireless LAN environment becomes very low and the throughput suffers drastically.

Under high bit error rate, the packet loss recovery (or Aggressive Error Recovery—AER) in TCP Noor utilizes the fact that losses in a wireless environment are not necessarily an indication of congestion. Additionally, the AER allows a larger congestion window and an exponential growth in congestion window after a timeout (i.e. the retransmission timer expired) or after the reception of three duplicate acknowledgments. This results in higher bandwidth utilization and significant throughput improvements. Timeouts in a wireless LAN can be attributed to a fading in the RF channel or a high BER that causes packet (or data) loss. However, once the fading or the high BER has ended, the channel is available for use at its full capacity. Traditional TCP is not optimized for use on RF channels and assumes a congestion state resulting in severe degradation of throughput. TCP Noor's AER provides an alternative solution for RF channels that suffer from transient data losses. During AER, when a timer expires (after 5 seconds, for example) or three duplicate acknowledgments are received (i.e. sent 4 packets but acknowledged the first packet three times), the cwnd is set to half of the maximum allowed window size and the ssthresh is set to the maximum allowed window size. Additionally, for every acknowledgment that is received, the cwnd is incremented by one packet (or segment) resulting in exponential congestion window growth. The AER allows the immediate retransmission of half of the maximum window upon a timeout or after a reception of three duplicate acknowledgments. This allows TCP Noor to maintain a consistent transfer rate and to send (when the ssthresh is set to the maximum allowed window size) multiple segments. The other aggressive behavior of AER is the exponential growth in the cwnd.

An advantage of making the cwnd a variable of the maximum window is to allow future Quality of Service parameter setting in terms of bandwidth allocation among wireless users. The engineering of an optimal window size is a good mechanism to reflect the bandwidth demand on a per user/connection basis. In standard TCP, users with a large window size who are sharing the wireless link during high BER, will gain on the average the same throughput as users with a smaller window size.

In an alternate embodiment of the present invention, the TCP congestion window could be made larger (i.e. exponentially grown) by setting the congestion window to more than half of the maximum allowed window size. Doing so, could provide a higher throughput from 100 Kbps to 2000 Kbps, for example.

In a further alternate embodiment of the present invention, the TCP congestion window could be exponentially grown by automatically adjusting the congestion window size to be a variable of the maximum allowed window size as the BER changes between low and high. Additionally, the packet size could be dynamically adjusted. If the BER was high, the packet size could be reduced to get higher throughput (using TCP Noor). If the BER was low, the packet size could be increased to also get higher throughput (because there would not be as many errors or packets lost on the wireless link).

In another alternate embodiment, the congestion window may be set to a value that is significantly larger than the value provided in standard TCP (described above). Doing so provides an alternative to setting the congestion window to half of the maximum allowed window size.

Figure 2:
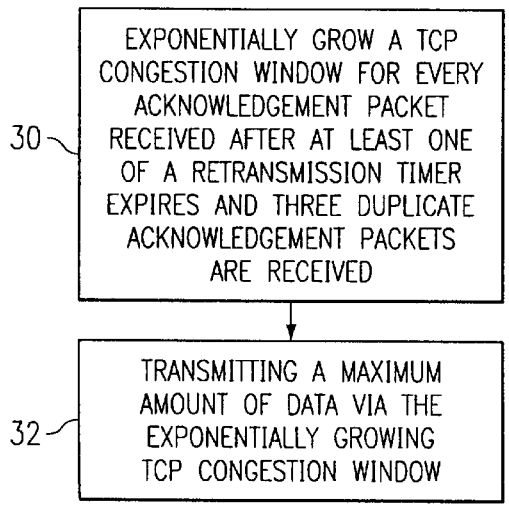
FIG. 2 is a flow chart of a method for TCP packet loss recovery over a wireless link of the present invention.

FIG. 2 describes a method for TCP packet loss recovery over a wireless link where the packet loss is due to a high BER. The method begins at step 30 where a TCP congestion window is exponentially grown for every acknowledgement packet received after at least one of: a retransmission timer expires and three duplicate acknowledgment packets are received. The method proceeds to step 32 where a maximum amount of data is transmitted via the exponentially growing TCP congestion window thereby optimizing packet throughput.

Figure 3:
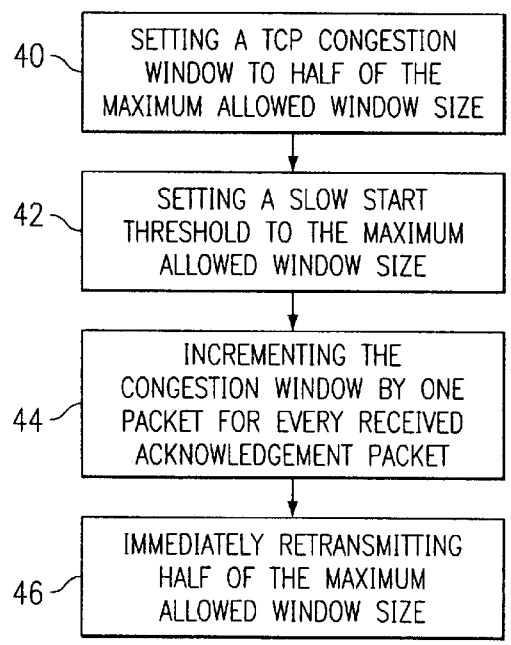
FIG. 3 is a flow chart of a method for exponentially growing a TCP congestion window and sending a maximum amount of data within a threshold of the present invention.

FIG. 3 describes a method for exponentially growing the TCP congestion window and sending a maximum amount of data within a threshold. The method begins at step 40 where the congestion window is set to half of the maximum allowed window size. The method proceeds to step 42 where a slow start threshold is set to the maximum allowed window size. At step 44 the congestion window is incremented by one packet for every received acknowledgement packet. The method proceeds to step 46 where half of the maximum allowed window size is immediately retransmitted.

Figure 4:
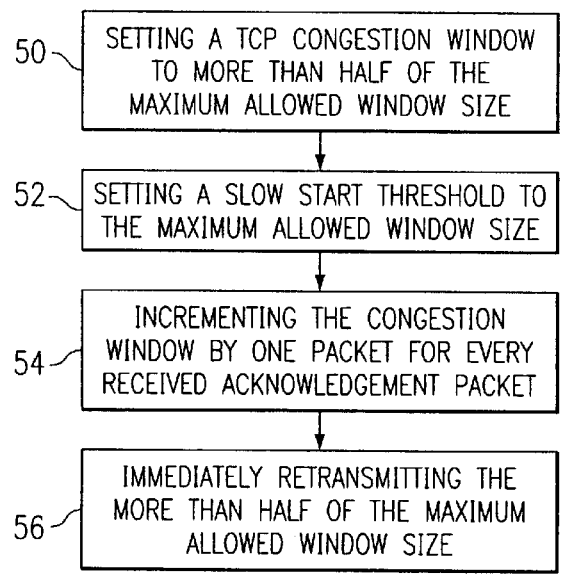
FIG. 4 is a flow chart of an alternate method for exponentially growing a TCP congestion window of the present invention.

FIG. 4 describes a method for exponentially growing the TCP congestion window. The method begins at step 50 where the congestion window is set to more than half of the maximum allowed window size (to provide a higher throughput). At step 52 a slow start threshold is set to the maximum allowed window size. At step 54 the congestion window is incremented by one packet for every received acknowledgement packet. The method proceeds to step 56 where the more than half of the maximum allowed window size is immediately retransmitted.

Figure 5:
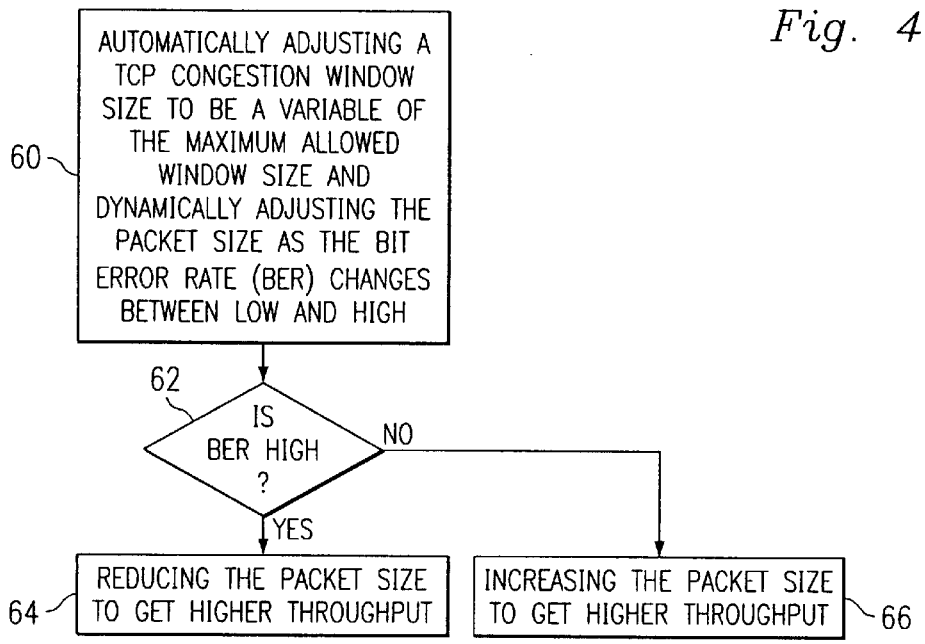
FIG. 5 is a flow chart of another alternate method for exponentially growing a TCP congestion window of the present invention.

FIG. 5 describes a further method for exponentially growing the TCP congestion window. The method begins at step 60 where the congestion window size is automatically adjusted to be a variable of the maximum allowed window size and the packet size is dynamically adjusted as the BER changes between low and high. At step 62 a check is made to see if the BER is high. If it is, the method proceeds to step 64 where the packet size is reduced to get a higher throughput. If it is not (i.e. the BER is low), the packet size is increased to also get higher throughput.

Figure 6:
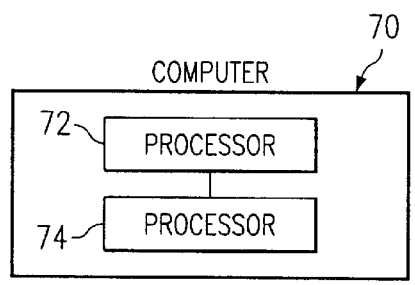
FIG. 6 is a diagrammatic view of a computer and memory of the present invention.

FIG. 6 depicts a computer 70 that comprises a processor 72 and memory 74. The computer 70 may be a personal computer, a laptop, a basestation 12, a mobile terminal 14, and/or any device that can send and receive TCP information. The memory 74 may be read-only memory (ROM), random access memory (RAM), flash memory and/or any device that stores digital information. The processor 72 may be a central processing unit (CPU), digital signal processor (DSP), microprocessor, microcontroller, microcomputer, and/or any device that manipulates digital information based on programming instructions. The memory 74 is coupled to the processor 72 and stores programming instructions that, when read by the processor, cause the processor to exponentially grow a TCP congestion window for every acknowledgement packet received (after at least one of: a retransmission timer expires and three duplicate acknowledgment packets are received) and send a maximum amount of data within a threshold. The processor 72 may also be caused to set the congestion window to half of the maximum allowed window size, set a slow start threshold to the maximum allowed window size, increment the congestion window by one packet for every received acknowledgement packet, and immediately retransmit half of the maximum allowed window size.

The processor 72 may further be caused to set the congestion window to more than half of the maximum allowed window size or to automatically adjust the congestion window size to be a variable of the packet size as the BER changes between low and high. If the BER is high, the processor is further caused to reduce the packet size to get higher throughput and if the BER is low, the processor is further caused to increase the packet size to get higher throughput.

The present invention thus enjoys several advantages. For example, a new version of TCP, TCP Noor, is discussed which improves TCP's packet loss or error recovery using the Aggressive Error Recovery (AER) mechanism. This packet loss recovery occurs over wireless lossy links under a high BER in a completely wireless network (or system). If the AER was not utilized at a high bit error rate, the wireless source will be transmitting at a low rate and bandwidth would go unutilized. Additionally, the TCP congestion window is exponentially grown for every acknowledgement packet that is received after a retransmission timers expires and/or three duplicate acknowledgement packets are received. And, a maximum amount of data within a threshold is then sent. Further, the congestion window may be set to a greater amount than originally set of the maximum allowed window size and may be a variable of the packet size as the BER changes between low and high.

It is understood that variations may be made in the foregoing without departing from the scope of the present invention. For example, the system may include more than one basestation and each basestation may transmit and receive packets to and from a plurality of mobile terminals. Further, the system may include a wireless source and/or destination that is engaged in an active session with a wireline source and/or destination. Additionally, a different system than the wireless LAN system that was described may be utilized with the present invention. Such a system may be a wireless Wide Area Network (WAN), a cellular network, etc. Further, a different protocol than the FTP that was described may be utilized with the present invention. Such a protocol could be a Hyper Text Transfer Protocol (HTTP). Still further, in addition to mobile terminals, different mobile devices may be utilized in the system of the present invention. Such devices would be capable of "running" TCP (or TCP/IP) and could include personal computers, laptops, palm computing devices, or portable network appliances. Additionally, voice packets may be transmitted via the exponentially growing TCP congestion window.

It is understood that other modifications, changes and substitutions are intended in the foregoing disclosure and in some instances some features of the disclosure will be employed without corresponding use of other features. Accordingly, it is appropriate that the appended claims be construed broadly and in a manner consistent with the scope of the disclosure.

What is claimed is:

1. A method for Transmission Control Protocol (TCP) packet loss recovery over a wireless link, wherein the packet loss is due to a high Bit Error Rate (BER), the method comprising:

exponentially growing a TCP congestion window for every acknowledgement packet received after at least one of: expiration of a retransmission timer and receipt of three duplicate acknowledgment packets, wherein exponentially growing the TCP congestion window further comprises: as the BER changes between low and high, automatically adjusting the congestion window size to be a variable of the maximum allowed window size and dynamically adjusting the packet size; and transmitting, via the exponentially growing TCP congestion window, a maximum amount of data.

2. The method of claim 1 further comprising:
if the BER is high, reducing the packet size to get higher throughput; and
if the BER is low, increasing the packet size to get higher throughput.

3. A system for Transmission Control Protocol (TCP) packet loss recovery over a wireless link, wherein the packet loss is due to a high Bit Error Rate (BER), the system comprises:

means for exponentially growing a TCP congestion window for every acknowledgement packet received after at least one of: a retransmission timer expires and three duplicate acknowledgment packets are received, wherein the means for exponentially growing the TCP congestion window comprises, as the BER changes between low and high, means for automatically adjusting the congestion window size to be a variable of the maximum allowed window size, and dynamically adjusting the packet size; and means for transmitting, via the exponentially growing a TCP congestion window, a maximum amount of data.

4. The system of claim 3 wherein the means for exponentially growing the TCP congestion window further comprises:

means for setting a slow start threshold to the maximum allowed window size; and means for incrementing the congestion window by one packet for every received acknowledgement packet.

5. The system of claim 3 wherein the means for transmitting the maximum amount of data within the threshold further comprises:

means for immediately retransmitting half of the maximum allowed window size.

6. The system of claim 3 wherein the variable of the maximum allowed window size is greater than half of the maximum allowed window size.

7. The system of claim 3 further comprises:

if the BER is high, means for reducing the packet size to get higher throughput; and if the BER is low, means for increasing the packet size to get higher throughput.

8. The system of claim 3 wherein the variable of the maximum allowed window size is a value that is significantly larger than the value provided in standard TCP.

9. A system for Transmission Control Protocol (TCP) packet loss recovery over a wireless link, wherein the packet loss is due to a high Bit Error Rate (BER), the system comprising:

a basestation; and mobile terminals, wherein TCP packets are transmitted and received between the basestation and the mobile terminals and between the mobile terminals, wherein a TCP congestion window is exponentially grown for every acknowledgement packet received after at least one of: a retransmission timer expires and three duplicate acknowledgment packets are received, wherein exponentially growing the congestion window further comprises: as the BER changes between low and high, automatically adjusting the congestion window size to be a variable of the maximum allowed window size and dynamically adjusting the packet size; and wherein a maximum amount of data is transmitted via the exponentially grown TCP congestion window.

10. The system of claim 9 further comprises:

if the BER is high, reducing the packet size to get higher throughput; and if the BER is low, increasing the packet size to get higher throughput.

11. A computer comprising:

a processor; and memory coupled to the processor, wherein the memory stores programming instructions that, when read by the processor, cause the processor to:

exponentially grow a TCP congestion window for every acknowledgement packet received after at least one of: a retransmission timer expires and three duplicate acknowledgment packets are received;

transmit, via the exponentially growing TCP congestion window, a maximum amount of data;

as the BER changes between low and high, automatically adjust the value of the congestion window size to be a variable of the maximum allowed window size; and dynamically adjust the packet size.

12. The computer of claim 11 wherein the memory further comprises programming instructions that cause the processor to:

if the BER is high, reduce the packet size to get higher throughput; and if the BER is low, increase the packet size to get higher throughput.

* * * * *